United States Patent
Dutta et al.

(10) Patent No.: US 9,949,121 B2
(45) Date of Patent: Apr. 17, 2018

(54) OPTIMAL TUNE AWAY SCHEME FOR CIRCUIT SWITCHED CALLS ON VIRTUAL SUBSCRIBER IDENTITY MODULE

(71) Applicant: QUALCOMM Incorporated, San Diego, CA (US)

(72) Inventors: Himanshu Dutta, Hyderabad (IN); Raghavendra Shyam Ananda, Hyderabad (IN); Kishore Kumar Yannakula, Hyderabad (IN); Suresh Sanka, Hyderabad (IN); Vagish Gupta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/166,031

(22) Filed: May 26, 2016

(65) Prior Publication Data

US 2017/0347263 A1 Nov. 30, 2017

(51) Int. Cl.
*H04M 1/66* (2006.01)
*H04W 12/06* (2009.01)
*H04W 8/18* (2009.01)

(52) U.S. Cl.
CPC .......... *H04W 12/06* (2013.01); *H04W 8/183* (2013.01)

(58) Field of Classification Search
CPC ............................. H04W 8/183; H04W 12/06
USPC ................. 455/435.1, 435.2, 550, 551, 552.1
See application file for complete search history.

(56) References Cited

U.S. PATENT DOCUMENTS

2015/0304506 A1 10/2015 Zhu et al.
2016/0323256 A1* 11/2016 Shahidi .................. H04L 63/18
2017/0134298 A1* 5/2017 Walke ................... H04W 8/183

FOREIGN PATENT DOCUMENTS

EP 1850607 A2 10/2007
WO 2014110606 A1 7/2014

OTHER PUBLICATIONS

Partial International Search Report—PCT/US2017/034188—ISA/EPO—dated Sep. 1, 2017.
International Search Report and Written Opinion—PCT/US2017/034188—ISA/EPO—dated Dec. 7, 2017.

* cited by examiner

*Primary Examiner* — Chuck Huynh
(74) *Attorney, Agent, or Firm* — Procopio, Cory, Hargreaves & Savitch LLP

(57) ABSTRACT

A method for authenticating a circuit switched (CS) call on a virtual subscriber identity module (VSIM) includes: authenticating the VSIM for a packet switched (PS) call connection using authentication information obtained from a remote server through a software subscriber identity module (soft-SIM) connection to the remote server; initiating a call connection on a CS radio access technology (RAT) between the VSIM and a first communication network; and authenticating the VSIM CS call connection to the first communication network through the VSIM PS connection in response to an authentication request for the call connection on the CS RAT.

10 Claims, 7 Drawing Sheets

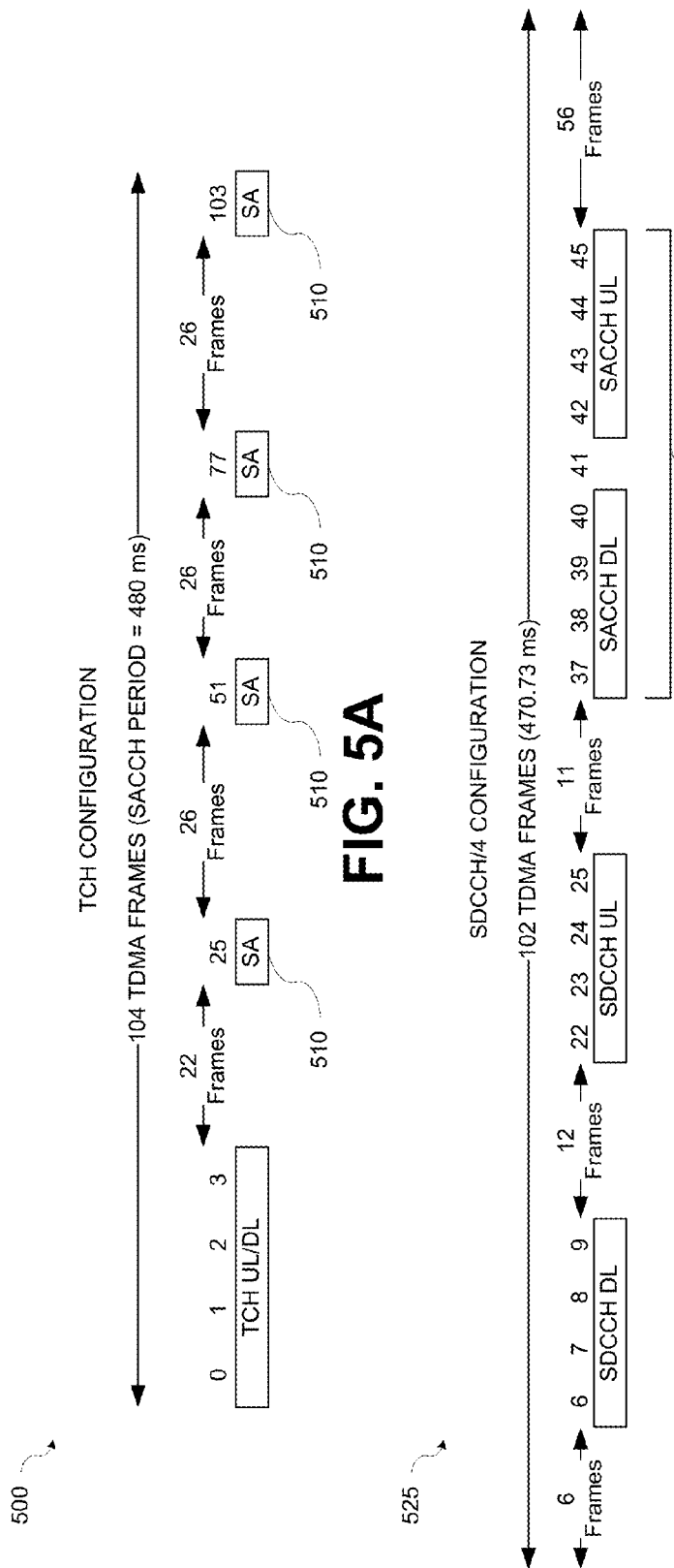
FIG. 5A
FIG. 5B
FIG. 5C

_US 9,949,121 B2_

OPTIMAL TUNE AWAY SCHEME FOR CIRCUIT SWITCHED CALLS ON VIRTUAL SUBSCRIBER IDENTITY MODULE

BACKGROUND

A Virtual-SIM (VSIM) is subscriber identity module (SIM) software that acts as a SIM interface with a mobile communication device. A physical SIM corresponding to the VSIM may be available at remote server. When the physical SIM is necessary for authentication purpose, the VSIM accesses a remote SIM server using a secure Internet protocol (IP) tunnel. To enable the VSIM to establish the secure IP tunnel to the remote SIM server the mobile communication device may utilize a software SIM (soft-SIM). The soft-SIM may be preloaded or downloaded to the secure file system of the mobile communication device. The soft-SIM may remain preloaded in mobile communication device and may be used by the mobile communication device to only access the remote SIM server using remote sim access protocol (RSAP) over the secure IP tunnel.

A typical use of a VSIM may be when a mobile communication device roams. A user may roam to a foreign country, use international roaming to configure a VSIM in a SIM slot and perform data services at low cost in the foreign country. The user's network operator or a third party may act as a Mobile Virtual Network Operator (MVNO) in the foreign countries and offer roaming data services at discount. The user's network operator may provide a VSIM application that configures the VSIM and soft-SIM and deactivates the physical SIM.

A conventional dual-SIM dual-standby (DSDS) or multi-SIM multi-standby (MSMS) mobile communication device utilizing a VSIM may perform authentication procedures for circuit switched (CS) and packet switched (PS) activation, for example, registration procedures such as location area update (LAU), routing area update (RAU), tracking area update (TAU), and attach procedures. To activate the VSIM PS connection, the mobile communication device may tune away from VSIM network and connect to the soft-SIM network using the soft-SIM subscription. The soft-SIM subscription may acquire an Authentication Response and corresponding keys from the remote server. During this time, the VSIM subscription triggered connection may remain disconnected. The disconnection may be in the order of few seconds and VSIM PS connection may subsequently be re-established. However, issues may arise when activating the VSIM CS connection.

When activating the VSIM CS connection, long tune away may lead to delay in establishing CS calls. Also, long tune away may result in abnormal CS call release or complete service denial due to the VSIM network interpreting the time to receive a response to authentication as abnormal. Further, if the mobile communication device is in mobility chances of missing handover messages and/or measurements increases. Also, if the soft-SIM subscription is in mobility a long tune away duration may be necessary to accommodate cell reselection, system information block (SIB) reads, acquisitions, etc.

SUMMARY

Apparatuses and methods for authenticating a circuit switched call on a VSIM CS call connection and for performing tune away to authenticate a CS call on a VSIM are provided.

According to various aspects there is provided a method for authenticating a circuit switched (CS) call on a virtual subscriber identity module (VSIM). In some aspects, the method may include: authenticating the VSIM for a packet switched (PS) call connection using authentication information obtained from a remote server through a software subscriber identity module (soft-SIM) connection to the remote server; initiating a call connection on a CS radio access technology (RAT) between the VSIM and a first communication network; and authenticating the VSIM CS call connection to the first communication network through the VSIM PS connection in response to an authentication request for the call connection on the CS RAT.

According to various aspects there is provided a mobile communication device. In some aspects, the mobile communication device may include: a communication unit configured to communicate with one or more communication networks; a secure file system configured to store a soft subscriber identity module (soft-SIM); a virtual subscriber identity module (VSIM); and a control unit operably connected to the communication unit, the secure file system, and the VSIM.

The control unit may be configured to authenticate for a packet switched (PS) connection on the VSIM using authentication information obtained from a remote server through a soft-SIM connection to the remote server; control the communication unit to initiate a call connection on a CS radio access technology (RAT) between the VSIM and a first communication network; and authenticate the VSIM CS call connection to the first communication network through the VSIM PS connection in response to a call connection authentication request for the call on the CS RAT.

According to various aspects there is provided a method for tune away to authenticate a virtual subscriber identity module (VSIM) for a call connection on a circuit switched (CS) radio access technology (RAT). In some aspects, the method may include: authenticating the VSIM for a packet switched (PS) call through a software subscriber identity module (soft-SIM) connection to a remote server; determining whether a call connection authorization request for a call connection on a CS RAT on the VSIM is received; in response to determining that the call connection authorization request for the call connection on the CS RAT on the VSIM is received, tuning away from the CS RAT to the remote server through the soft-SIM connection to the remote server; determining whether an authorization for the call connection on the CS RAT on the VSIM is taking place through traffic channel (TCH) signaling or through stand-alone dedicated control channel (SDCCH) signaling; and in response to determining that the authorization for the call connection on the CS RAT on the VSIM is taking place through TCH signaling, tuning back to the CS RAT based on slow access control channel (SACCH) bursts in a configuration of the TCH signaling.

According to various aspects there is provided a mobile communication device. In some aspects, the mobile communication device may include: a communication unit configured to communicate with one or more communication networks; a secure file system configured to store soft subscriber identity module (soft-SIM); a virtual subscriber identity module SIM (VSIM); and a control unit operably connected to the communication unit, the secure file system, and the VSIM.

The control unit may be configured to authenticate the VSIM for a packet switched (PS) connection via a software subscriber identity module (soft-SIM) connection to a remote server; control the communication unit to determine whether an call connection authorization request for a call connection on a circuit switched (CS) on the VSIM is received; in response to determining that the call connection authorization request for the call connection on the CS radio access technology (RAT) on the VSIM is received, control the communication unit to tune away from the CS RAT to the remote server via the soft-SIM connection to the remote server; determine whether an authorization for the call connection on the CS RAT on the VSIM is taking place through traffic channel (TCH) signaling or through stand-alone dedicated control channel (SDCCH) signaling; and in response to determining that the authorization for the call connection on the CS RAT on the VSIM is taking place through TCH signaling, control the communication unit to tune back to the CS RAT based on slow access control channel (SACCH) bursts in a configuration of the TCH signaling.

Other features and advantages should be apparent from the following description which illustrates by way of example aspects of the various teachings of the disclosure.

BRIEF DESCRIPTION OF THE DRAWINGS

Aspects and features of the various examples will be more apparent by describing examples with reference to the accompanying drawings, in which:

FIG. 5A is a diagram illustrating a TCH signaling configuration;

FIG. 5B is a diagram illustrating an SDCCH/4 signaling configuration;

FIG. 5C is a diagram illustrating an SDCCH/8 signaling configuration;

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1A:
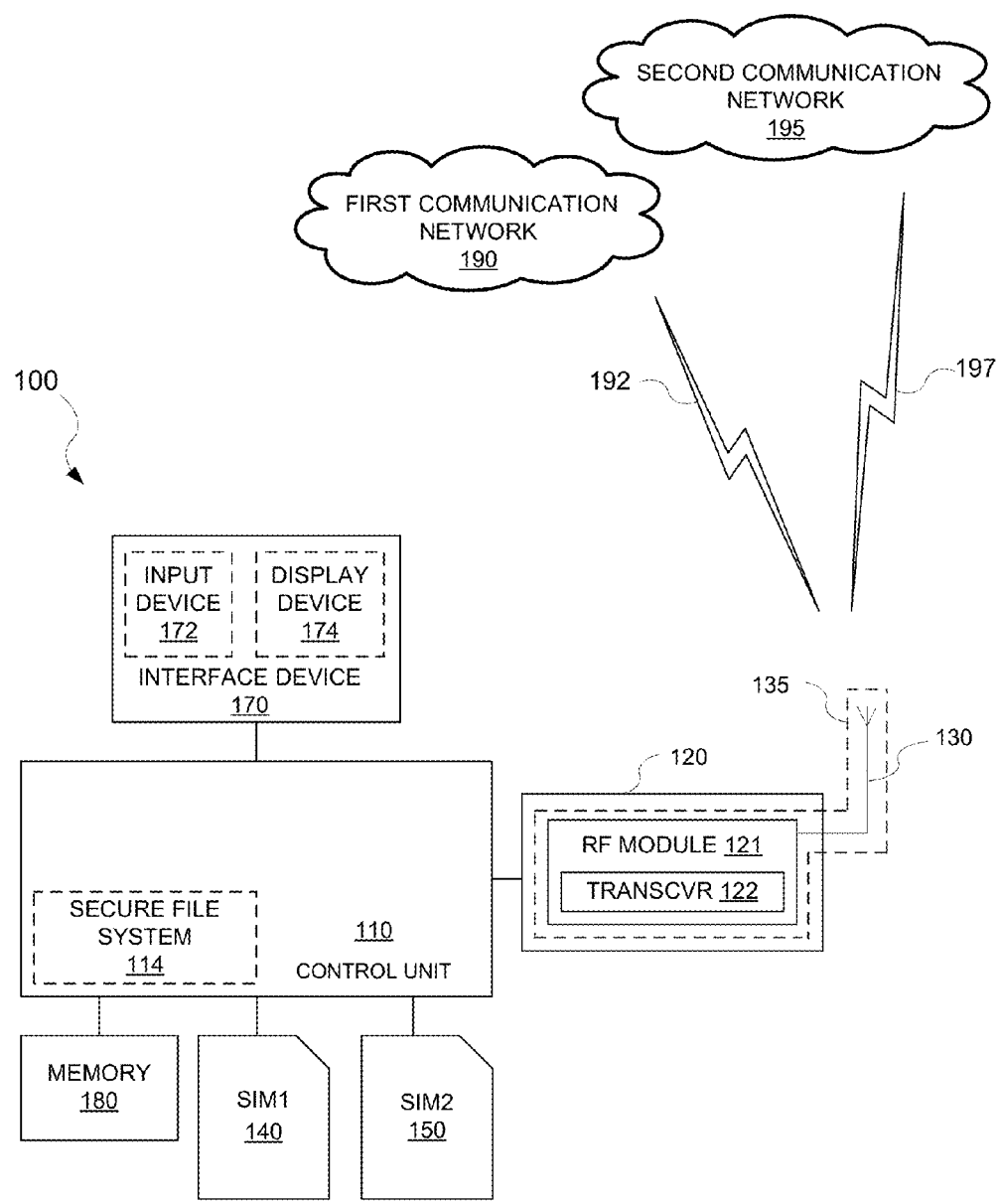
FIG. 1A is a block diagram illustrating a mobile communication device according to various examples.

FIG. 1A is a block diagram illustrating a mobile communication device 100 according to various embodiments. As illustrated in FIG. 1A, the mobile communication device 100 may include a control unit 110, a communication unit 120, an antenna 130, a first subscriber identity module (SIM) 140, a second SIM 150, a user interface device 170, and a memory 180.

The mobile communication device 100 may be, for example but not limited to, a mobile telephone, smartphone, tablet, computer, etc., capable of communications with one or more wireless networks. One of ordinary skill in the art will appreciate that the mobile communication device 100 may include one or more transceivers (communication units) and may interface with one or more antennas without departing from the scope of protection.

The communication unit 120 may include, for example, but not limited to, an RF module 121. The RF module 121 may include, for example, but not limited to the first transceiver 122. An RF chain 135 may include, for example, but not limited to the antenna 130 and the RF module 121.

One of ordinary skill in the art will appreciate that embodiments of the mobile communication device 100 may include more than one communication unit and/or more than one antenna without departing from the scope of protection.

A SIM (for example the first SIM 140 and/or the second SIM 150) in various embodiments may be a universal integrated circuit card (UICC) that is configured with SIM and/or universal SIM (USIM) applications, enabling access to global system for mobile communications (GSM) and/or universal mobile telecommunications system (UMTS) networks. The UICC may also provide storage for a phone book and other applications. Alternatively, in a code division multiple access (CDMA) network, a SIM may be a UICC removable user identity module (R-UIM) or a CDMA subscriber identity module (CSIM) on a card. A SIM card may have a CPU, ROM, RAM, EEPROM and I/O circuits. An integrated circuit card identity (ICCID) SIM serial number may be printed on the SIM card for identification. However, a SIM may be implemented within a portion of memory of the mobile communication device 100, and thus need not be a separate or removable circuit, chip, or card.

A SIM used in various embodiments may store user account information, an international mobile subscriber identity (IMSI), a set of SIM application toolkit (SAT) commands, and other network provisioning information, as well as provide storage space for phone book database of the user's contacts. As part of the network provisioning information, a SIM may store home identifiers (e.g., a system identification number (SID)/network identification number (NID) pair, a home public land mobile network (HPLMN) code, etc.) to indicate the SIM card network operator provider.

The first SIM 140 may associate the communication unit 120 with a first subscription (Sub1) 192 associated with a first radio access technology (RAT) on a first communication network 190 and the second SIM 150 may associate the communication unit 120 with a second subscription (Sub2) 197 associated with a second RAT on a second communication network 195. When a RAT is active, the communication unit 120 receives and transmits signals on the active RAT. When a RAT is idle, the communication unit 120 receives but does not transmit signals on the idle RAT.

For convenience, the various embodiments are described in terms of DSDS mobile communication devices. However, one of ordinary skill in the art will appreciate that the various embodiments may be extended to Multi-SIM Multi-Standby (MSMS) and/or Multi-SIM Multi-Active (MSMA) mobile communication devices without departing from the scope of protection.

The first communication network 190 and the second communication network 195 may be operated by the same or different service providers, and/or may support the same or different RATs, for example, but not limited to, GSM, CDMA, wideband CDMA (WCDMA), and long term evolution (LTE).

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the various embodiments.

The control unit 110 may be configured to control overall operation of the mobile communication device 100 including control of the communication unit 120, the user interface device 170, and the memory 180. The control unit 110 may be a programmable device, for example, but not limited to, a microprocessor (e.g., general-purpose processor, baseband modem processor, etc.) or microcontroller.

The control unit 110 may include a secure file system 114 configured to store encrypted files and/or information, for example, but not limited to, a software subscriber identity module (soft-SIM). Alternatively, the secure file system 114 may reside in the memory 180.

The memory 180 may be configured to store operating systems and/or application programs for operation of the mobile communication device 100 that are executed by the control unit 110, as well as to store application data and user data.

Figure 1B:
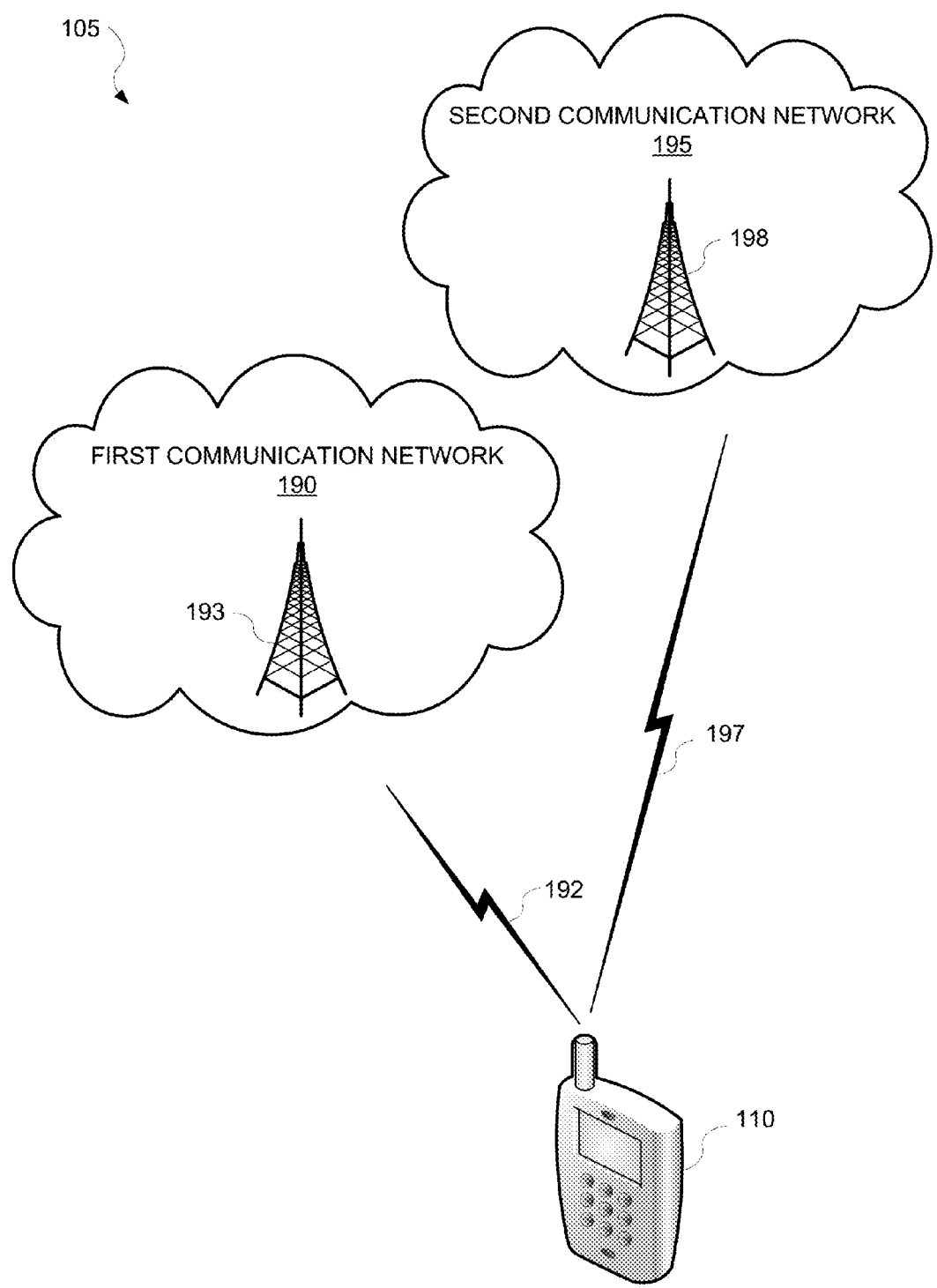
FIG. 1B is a diagram illustrating a network environment for various examples.

FIG. 1B is a diagram illustrating a network environment 105 for various embodiments. Referring to FIGS. 1A and 1B, a mobile communication device 100 may be configured to communicate with a first communication network 190 on a first subscription 192 and a second communication network 195 on a second subscription 197. One of ordinary skill in the art will appreciate that the mobile communication device may configured to communicate with more than two communication networks and may communicate on more than two subscriptions without departing from the scope of protection.

The first communication network 190 and the second communication network 195 may implement the same or different radio access technologies (RATs). For example, the first communication network 190 may be a GSM network and the first subscription 192 may be a GSM subscription. The second communication network 195 may also be a GSM network. Alternatively, the second communication network 195 may implement another RAT including, for example, but not limited to, LTE, WCDMA, and Time Division-Synchronous Code Division Multiple Access (TD-SCDMA).

The first communication network 190 may include one or more base transceiver stations (BTSs) including, for example, but not limited to, a first BTS 193. The second communication network 195 may also include one or more BTSs, including, for example, but not limited to, a second BTS 198. A person having ordinary skill in the art will appreciate that the network environment 105 may include any number of communication networks, mobile communication devices, and BTSs without departing from the scope of the various embodiments.

The mobile communication device 100 may attempt to acquire the first communication network 190 and camp on the first BTS 193. The mobile communication device 100 may also attempt to acquire the second communication network 195 and camp on the second BTS 198. A person having ordinary skill in the art will appreciate that the acquisition of the first communication network 190 performed on the first subscription 192 may be independent of the acquisition of the second communication network 195 performed on the second subscription 197. Furthermore, the mobile communication device 100 may attempt to acquire the first communication network 190 on the first subscription 192 and the second communication network 195 on the second subscription 197.

Figure 2:
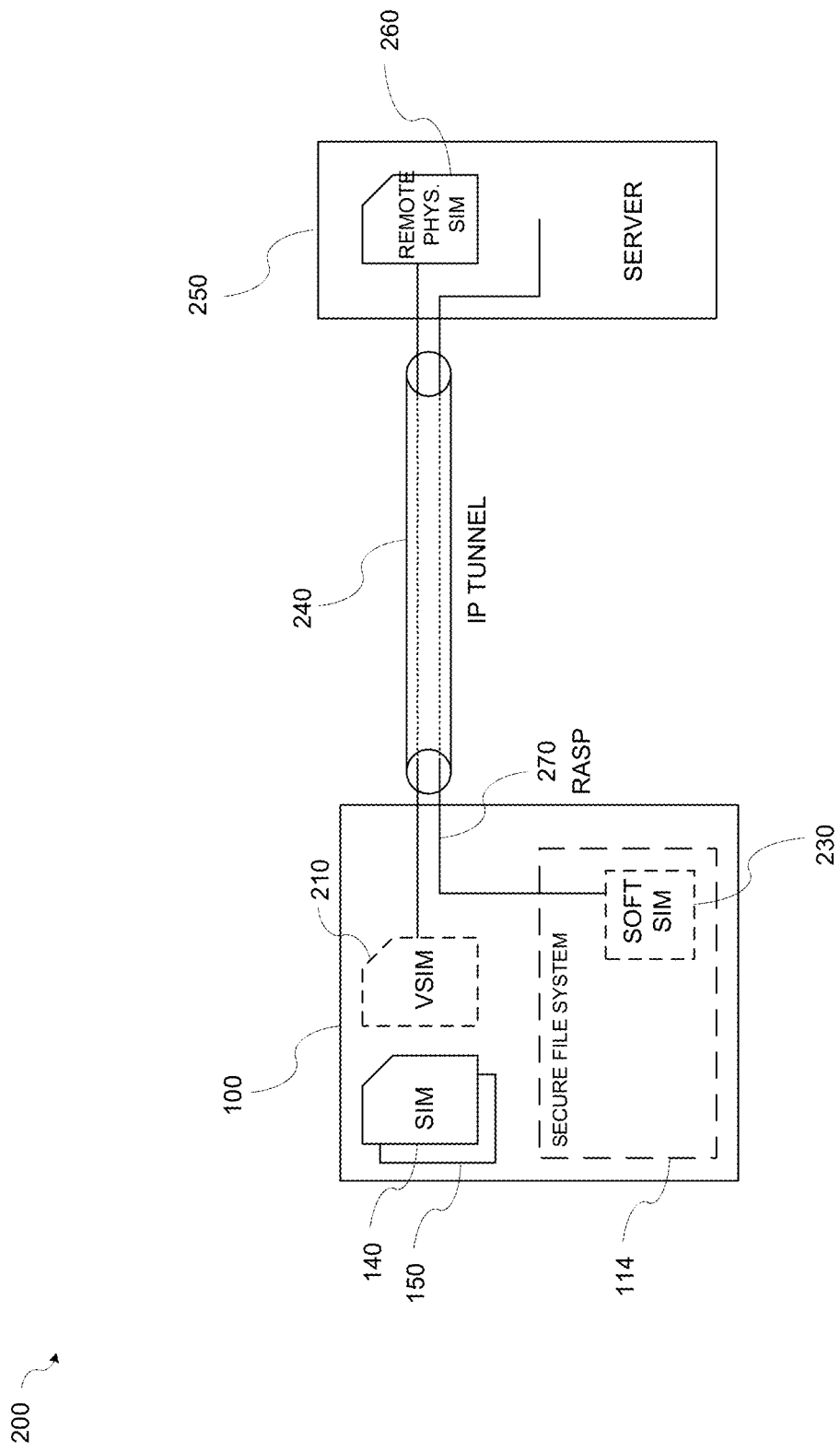
FIG. 2 is a diagram illustrating a mobile communication device including a VSIM having a connection to a remote server according to various examples.

FIG. 2 is a diagram illustrating a mobile communication device 100 including a VSIM 210 having a connection to a remote server 250 according to various examples. Referring to FIGS. 1A-2, in addition to physical SIMs (e.g., the first SIM 140 and the second SIM 150), a mobile communication device 100 may include a VSIM 210 and a soft-SIM 230. The soft-SIM 230 may be stored in the secure file system 114. The network provider may provide a VSIM application (not shown) that may configure the VSIM 210 and the soft-SIM 230 and deactivate the one or more physical SIMs. The soft-SIM 230 subscription may communicate 270 with a remote server 250 using remote SIM access protocol (RSAP) over a secure IP tunnel 240. The remote server may host a remote physical SIM 260 corresponding to the VSIM 210. The VSIM 210 may also access its remote physical SIM 260 on the remote server 250 via the secure IP tunnel 240.

In some examples, the mobile communication device 100 may use the VSIM 210 PS connection to authenticate the CS connection on the VSIM 210. Authentication means that the VSIM 210 connection is authenticated to the communication network (e.g., the first communication network 190) and vice versa. The VSIM 210 may operate in a dual transfer mode (DTM) (e.g., for GSM) or a multiple radio access bearer mode (e.g., for WCDMA) and therefore may maintain the CS call connection (i.e., may not tune away) during the CS call connection authentication process. Once the VSIM 210 PS registration is completed the VSIM PS connection may be used for all further authentication procedure handling with the remote server 250. Thus, the mobile communication device 100 may avoid using the soft-SIM 230 connection for connecting to the remote server 250 during authentication of the CS call connection on the VSIM 210. Alternatively, the mobile communication device 100 may use a PS connection of a physical SIM (e.g., the first SIM 140 or the second SIM 150) to authenticate the CS connection on the VSIM 210.

Figure 3:
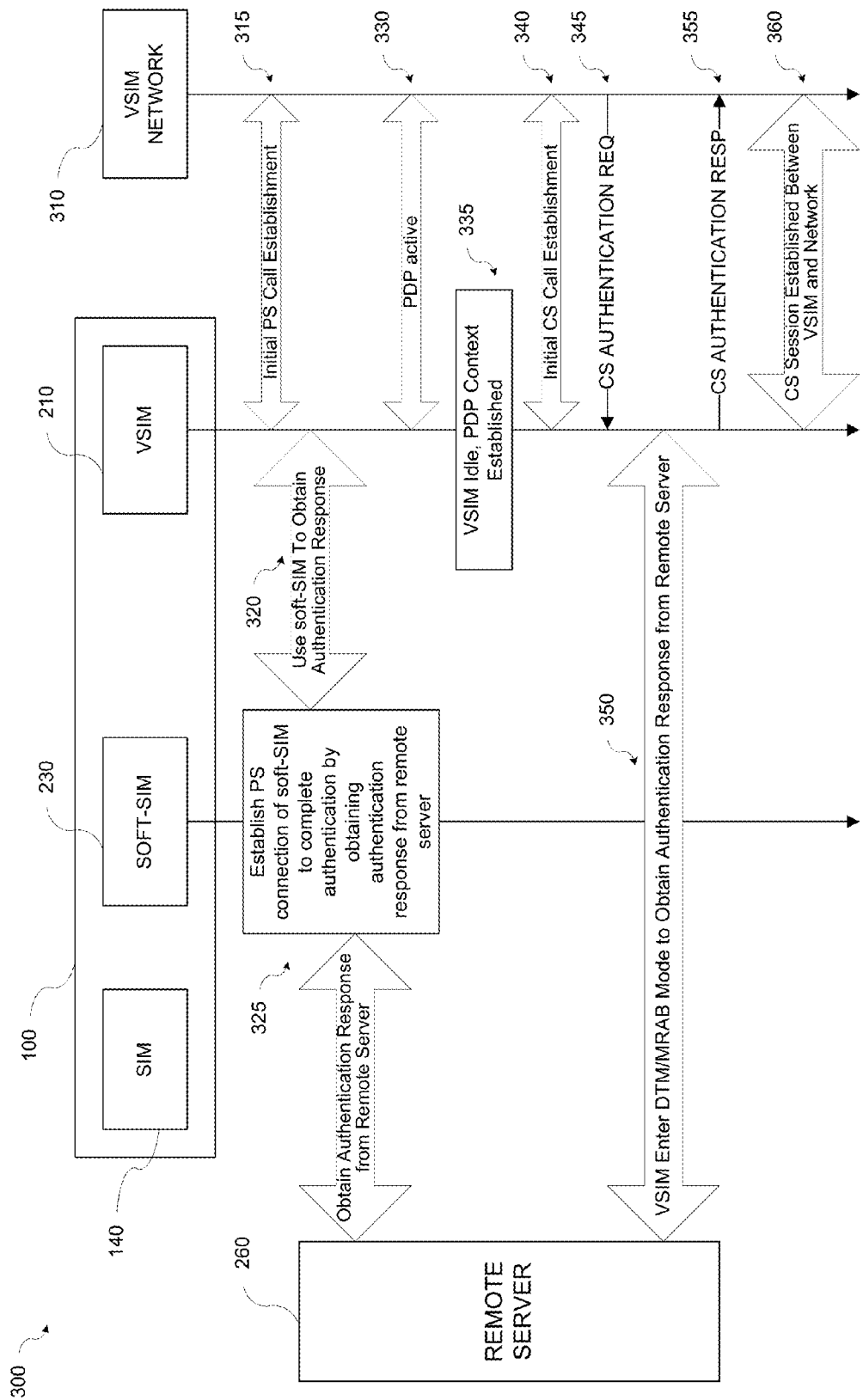
FIG. 3 is a sequence diagram illustrating CS call connection authentication for a VSIM according to various examples.

FIG. 3 is a sequence diagram illustrating CS call connection authentication 300 for a VSIM according to various examples. Referring to FIGS. 1A-3, at block 315 an initial PS connection establishment may take place between the VSIM 210 and the VSIM network 310 (e.g., the first communication network 190). At block 320 the soft-SIM 230 connection may be utilized to obtain an authentication response for the VSIM 210 PS connection. At block 325, the soft-SIM 230 may obtain an authentication response from the remote server 250 on a different communication network (e.g., the second communication network 195) to establish a PS connection with the VSIM network 310. At block 330 a packet data protocol (PDP) context may be activated between the VSIM 210 and the VSIM network 310. At block 335 the VSIM 210 may be in idle state with the PDP context established.

At block 340, an initial CS call connection establishment may take place between the VSIM 210 and the VSIM network 310 (e.g., the first communication network 190), and at block 345 and the VSIM network 310 may send a CS call connection authentication request to the VSIM 210. At block 350, the VSIM may enter a DTM mode (e.g., for a GSM RAT), or and MRAB mode (e.g., for a WCDMA) to obtain an authentication response from the remote server

250. At block 355 the VSIM 210 may provide the authentication response to the VSIM network 310, and at block 360 a CS session may be established between the VSIM 210 and the VSIM network 310.

Figure 4:
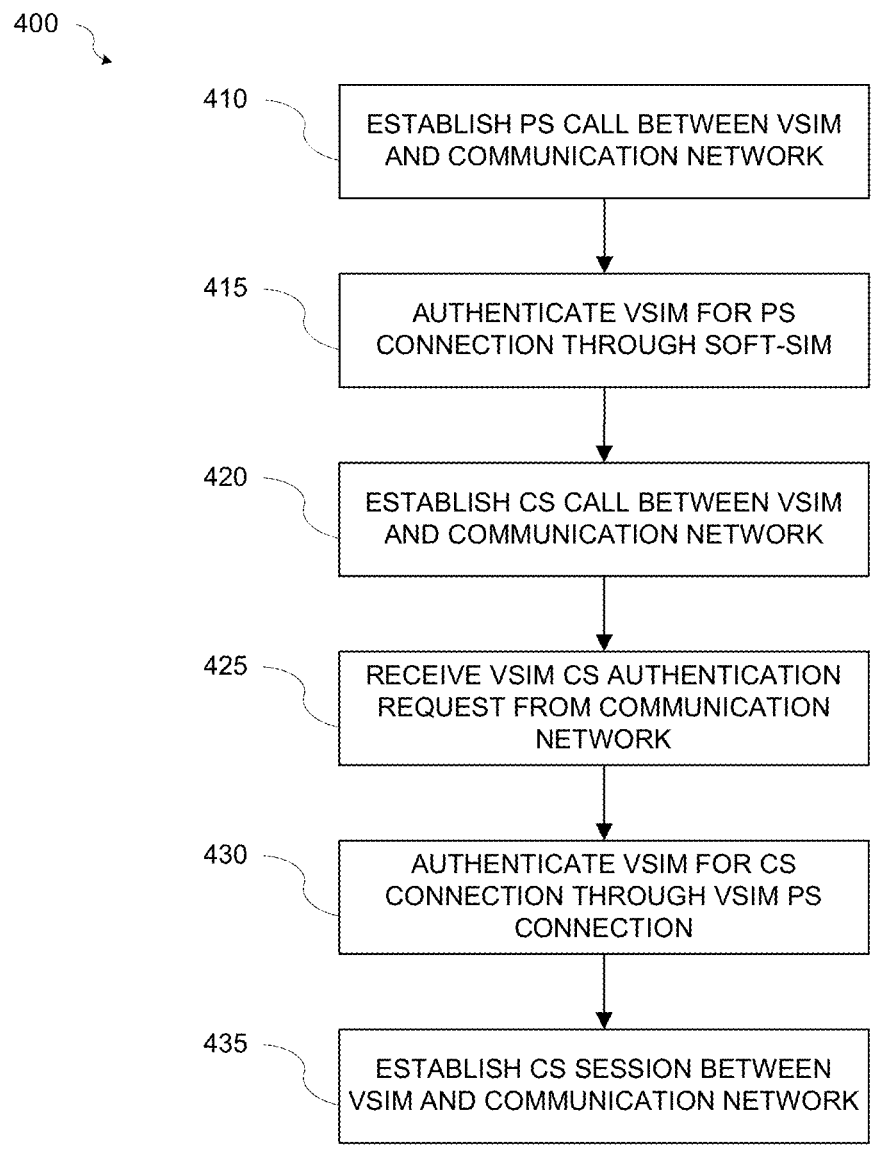
FIG. 4 is a flowchart illustrating a method for authenticating a circuit switched call on a VSIM CS call connection according to various examples.

FIG. 4 is a flowchart illustrating a method 400 for authenticating a circuit switched call on a VSIM CS call connection according to various examples. Referring to FIGS. 1A-4, at block 410 a PS connection may be established between the VSIM 210 and a communication network (e.g., the first communication network 190). For example, the control unit 110 may control the communication unit 120 to initiate a PS connection between the VSIM 210 and the first communication network 190.

At block 415, the VSIM 210 may be authenticated for the PS connection through the soft-SIM 230. For example, the control unit 110 may control the communication unit 120 to establish a connection with the remote server 250 (e.g., on the second communication network 195) through a soft-SIM 230 connection and may authenticate the VSIM 210 for the PS connection with the first communication network 190. The VSIM 210 PS connection may be authenticated using authentication information obtained from the remote server 250 through the soft-SIM 230 connection. A PDP context may be established between the VSIM 210 and the first communication network 190.

At block 420, a CS call connection may be established between the VSIM 210 and the first communication network 190. For example, the control unit 110 may control the communication unit 120 to initiate a call connection on a CS RAT between the VSIM 210 and the first communication network 190. At block 425, the control unit 110 may receive a VSIM CS call connection authentication request from the first communication network 190.

At block 430, the VSIM 210 CS call connection may be authenticated through the VSIM 210 PS connection. For example, the control unit 110 may control the VSIM 210 to enter a DTM mode (e.g., for a GSM RAT), or and MRAB mode (e.g., for a WCDMA) and may cause the communication unit 120 to obtain an authentication response for the VSIM 210 CS call connection from the remote server 250 on the second communication network 195. The control unit 110 may control the communication unit 120 to transmit the authentication response to the first communication network 190. At block 435 a CS session may be established between the VSIM 210 and the first communication network 190. Thus, authentication of the VSIM 210 CS connection may be accomplished while maintaining the initial CS call establishment connection.

Alternatively, the mobile communication device 100 may use a PS connection of a physical SIM (e.g., the first SIM 140 or the second SIM 150) to authenticate the CS connection on the VSIM 210 using a similar process.

In some examples, the mobile communication device 100 may tune away from the CS connection to the remote server network (e.g., the second communication network 195) during the CS call connection authentication process. When an authentication request is received for a GSM CS call connection on the VSIM 210, instead of dropping the call connection, the call connection may be continued but the mobile communication device 100 transceiver resources may be tuned away to the VSIM 210 PS connection having a PDP context activated on a soft-SIM 230 connection.

To avoid dropping the a GSM CS call connection for failure of the mobile communication device 100 to send slow access control channel (SACCH) measurement reports or failure to receive good SACCH blocks during the tune away period, the mobile communication device 100 may periodically tune back to the CS call connection during the SACCH burst instances. The periodic tune back to the CS call connection may be based on whether the VSIM 210 authentication is performed through traffic channel (TCH) signaling or standalone dedicated control channel (SDCCH) signaling.

FIG. 5A is a diagram illustrating a TCH signaling configuration 500. When the VSIM 210 authentication is performed through TCH signaling, then SACCH bursts 510 within a TCH block may be 26 time division multiple access (TDMA) frames apart, so tune back to the GSM call connection may occur after 26 TDMA frames (e.g., 120 ms). FIG. 5B is a diagram illustrating an SDCCH/4 signaling configuration 525 and FIG. 5C is a diagram illustrating an SDCCH/8 signaling configuration 550. When VSIM 210 authentication is performed through SDCCH signaling, the SACCH blocks 535 may be as shown for the SDCCH/4 signaling configuration 525 channel and the SACCH blocks 560 may be as shown for the SDCCH/8 signaling configuration 550 channel. Tune back to the GSM call connection may be performed according to the timing of the SACCH blocks.

Figure 6:
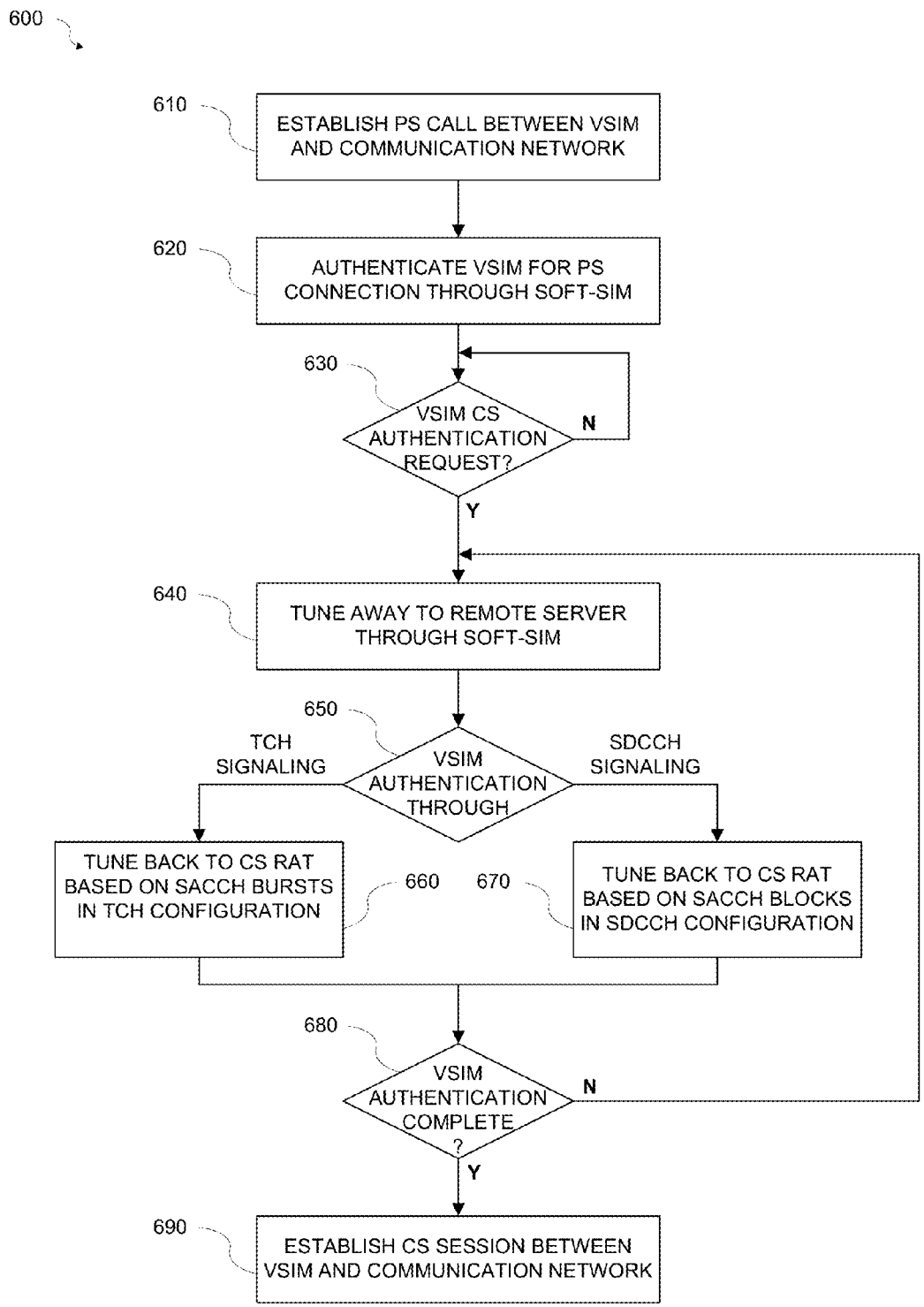
FIG. 6 is a flowchart illustrating a method for performing tune away to authenticate a CS call on a VSIM according to various examples.

FIG. 6 is a flowchart illustrating a method 600 for performing tune away to authenticate a CS call on a VSIM 210 according to various examples. Referring to FIGS. 1A-2 and 5A-6, at block 610 a PS connection may be established between the VSIM 210 and a communication network (e.g., the first communication network 190). For example, the control unit 110 may control the communication unit 120 to initiate a PS connection between the VSIM 210 and the first communication network 190.

At block 620, the VSIM 210 may be authenticated for the PS connection through the soft-SIM 230. For example, the control unit 110 may control the communication unit 120 to establish a connection with the remote server 250 (e.g., on the second communication network 195) through a soft-SIM 230 connection. The control unit 110 may authenticate the VSIM 210 for a PS connection to the first communication network 190 using authentication information obtained from the remote server 250 through the soft-SIM 230 connection. A PDP context may be established between the VSIM 210 and the first communication network 190.

At block 630, it may be determined whether a VSIM 210 CS connection authentication request is received. For example, the control unit 110 may control the communication unit 120 to establish a CS call connection between the VSIM 210 and the first communication network 190. The control unit 110 may control the communication unit 120 to initiate a call connection on a CS RAT between the VSIM 210 and the first communication network 190. In response, the control unit 110 may receive a VSIM 210 CS call connection authentication request from the first communication network 190.

In response to determining that a VSIM 210 CS call connection authentication request is received (630—Y) at block 640, the mobile communication device 100 may tune away to the soft-SIM 230 connection. For example, the control unit 110 may cause the communication unit 120 to tune away to the soft-SIM 230 connection with the remote server 250 on the second communication network 195 to obtain authentication information for the VSIM 210 CS call connection. At block 650, the control unit 110 may determine whether the VSIM 210 CS call connection authentication is being performed through TCH signaling or through SDCCH signaling.

In response to determining that the VSIM 210 CS call connection authentication is being performed through TCH signaling (650—TCH SIGNALING), at block 660 the mobile communication device 100 may tune back to the CS RAT based on the SACCH bursts 510 in the TCH signaling configuration 500. For example, the SACCH bursts 510 within a TCH block may be 26 TDMA frames apart, so the control unit 110 may control the communication unit 120 to tune back to the GSM call connection after 26 TDMA frames (e.g., 120 ms).

In response to determining that the VSIM 210 CS call connection authentication is being performed through SDCCH signaling (650—SDCCH SIGNALING), at block 670 the mobile communication device 100 may tune back to the CS RAT based on the SACCH blocks 535, 560 in the SDCCH signaling configuration 525, 550. For example, the SACCH blocks 535 may be as shown for the SDCCH/4 signaling configuration 525 channel and the SACCH blocks 560 may be as shown for the SDCCH/8 signaling configuration 550 channel. The control unit 110 may control the communication unit 120 to tune back to the GSM call connection according to the timing of the SACCH blocks.

At block 680, the control unit 110 may determine whether VSIM 210 CS call connection authentication for the CS call connection is complete. In response to determining that the CS call connection authentication is not complete (680—N), the control unit 110 may cause the communication unit 120 to tune away to the soft-SIM 230 connection at block 640. In response to determining that the CS call connection authentication is complete (680—Y), at block 690 the control unit may establish a CS session between the VSIM 210 and the first communication network 190.

The methods 400 and 600 may be embodied on a non-transitory computer readable medium, for example, but not limited to, the memory 180 or other non-transitory computer readable medium known to those of skill in the art, having stored therein a program including computer executable instructions for making a processor, computer, or other programmable device execute the operations of the methods.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for tune away to authenticate a virtual subscriber identity module (VSIM) for a call connection on a circuit switched (CS) radio access technology (RAT), the method comprising:
   authenticating the VSIM for a packet switched (PS) call through a software subscriber identity module (soft-SIM) connection to a remote server;
   determining whether a call connection authorization request for a call connection on a CS RAT on the VSIM is received;
   in response to determining that the call connection authorization request for the call connection on the CS RAT on the VSIM is received, tuning away from the CS RAT to the remote server through the soft-SIM connection to the remote server;
   determining whether an authorization for the call connection on the CS RAT on the VSIM is taking place through traffic channel (TCH) signaling or through standalone dedicated control channel (SDCCH) signaling; and
   in response to determining that the authorization for the call connection on the CS RAT on the VSIM is taking place through TCH signaling, tuning back to the CS RAT based on slow access control channel (SACCH) bursts in a configuration of the TCH signaling.

2. The method of claim 1, further comprising:
   uplinking SACCH measurement reports after tuning back to the CS RAT.

3. The method of claim 1, further comprising:
   in response to determining that the authorization for the call connection on the CS RAT on the VSIM is taking place through standalone dedicated control channel (SDCCH) signaling, tuning back to the call on the CS RAT based on SACCH blocks in a configuration of the SDCCH signaling.

4. The method of claim 3, further comprising:
   uplinking SACCH measurement reports to a first communication network after tuning back to the CS RAT.

5. The method of claim 1, wherein the CS RAT is GSM.

6. A mobile communication device, comprising:
   a communication unit configured to communicate with one or more communication networks;
   a secure file system configured to store soft subscriber identity module (soft-SIM);
   a virtual subscriber identity module SIM (VSIM); and
   a control unit operably connected to the communication unit, the secure file system, and the VSIM,
   wherein the control unit is configured to:
   authenticate the VSIM for a packet switched (PS) connection via a software subscriber identity module (soft-SIM) connection to a remote server;
   control the communication unit to determine whether a call connection authorization request for a call connection on a circuit switched (CS) radio access technology (RAT) on the VSIM is received;
   in response to determining that the call connection authorization request for the call connection on the CS RAT on the VSIM is received, control the communication unit to tune away from the CS RAT to the remote server via the soft-SIM connection to the remote server;
   determine whether an authorization for the call connection on the CS RAT on the VSIM is taking place through traffic channel (TCH) signaling or through standalone dedicated control channel (SDCCH) signaling; and
   in response to determining that the authorization for the call connection on the CS RAT on the VSIM is taking place through TCH signaling, control the communication unit to tune back to the CS RAT based on slow access control channel (SACCH) bursts in a configuration of the TCH signaling.

7. The mobile communication device of claim 6, wherein the control unit is configured to control the communication unit to uplink SACCH measurement reports after tuning back to the CS RAT.

8. The mobile communication device of claim 6, wherein in response to determining that the authorization for the call connection on the CS RAT on the VSIM is taking place through SDCCH signaling, the control unit is configured to control the communication unit to tune back to the CS RAT based on SACCH blocks in a configuration of the SDCCH signaling.

9. The mobile communication device of claim 8, wherein the control unit is configured to control the communication unit to uplink SACCH measurement reports after tuning back to the CS RAT.

10. The mobile communication device of claim 6, wherein the CS RAT is GSM.

* * * * *